US011400565B2

(12) United States Patent
Stenhouse et al.

(10) Patent No.: US 11,400,565 B2
(45) Date of Patent: Aug. 2, 2022

(54) TENSION LEVER

(71) Applicant: MW Products, LLC, Phoenix, AZ (US)

(72) Inventors: Brett Stenhouse, Phoenix, AZ (US); Alexander Robertson, Phoenix, AZ (US)

(73) Assignee: MW PRODUCTS, LLC, Phoenix, AZ (US)

( * ) Notice: Subject to any disclaimer, the term of this patent is extended or adjusted under 35 U.S.C. 154(b) by 159 days.

(21) Appl. No.: 15/650,815

(22) Filed: Jul. 14, 2017

(65) Prior Publication Data

US 2019/0015956 A1   Jan. 17, 2019

(51) Int. Cl.
| | |
|---|---|
| *B25B 13/44* | (2006.01) |
| *B25B 13/48* | (2006.01) |
| *B25B 23/08* | (2006.01) |
| *A47B 96/06* | (2006.01) |
| *F16M 13/02* | (2006.01) |
| *F16M 11/10* | (2006.01) |
| *F16M 11/20* | (2006.01) |

(52) U.S. Cl.
CPC .............. *B25B 13/44* (2013.01); *A47B 96/06* (2013.01); *B25B 13/481* (2013.01); *B25B 23/08* (2013.01); *F16M 11/10* (2013.01); *F16M 11/2085* (2013.01); *F16M 13/02* (2013.01)

(58) Field of Classification Search
CPC ......... B25B 13/48; B25B 13/44; B25B 27/00; B25B 27/0007; B25B 13/481; B25B 23/08; B60G 2206/601; F16M 2200/00; F16M 2007/0842; F16M 2200/041; F16M 11/10; F16M 13/02; F16H 2007/0842; A47B 96/06
USPC .... 81/177.5, 488, 121.1, 486, 484, 52, 53.2; 248/371, 917–923
See application file for complete search history.

(56) References Cited

U.S. PATENT DOCUMENTS

| | | | | |
|---|---|---|---|---|
| 4,057,890 A | * | 11/1977 | Feen ........................ | B25B 13/02 29/426.4 |
| 4,086,828 A | * | 5/1978 | Mader ..................... | B25B 27/00 254/126 |
| 5,285,543 A | * | 2/1994 | Rowe ...................... | B25B 13/06 7/138 |
| 5,737,981 A | * | 4/1998 | Hildebrand ............. | B25B 13/48 81/120 |

(Continued)

*Primary Examiner* — Monica S Carter
*Assistant Examiner* — Abbie E Quann
(74) *Attorney, Agent, or Firm* — Dickinson Wright PLLC

(57) ABSTRACT

A tension lever includes an outer body including a top, a bottom, and a plurality of outer body sides including a first outer body side and a second outer body side opposite to and facing the first outer body side, the first outer body side having a substantially planar surface extending along a first direction and a second direction crossing the first direction, an upper first opening defined in the top and defining an upper inner body that extends along the second direction, a lower first opening defined in the bottom and defining a lower inner body that extends along the second direction, a second opening defined in the first outer body side and the second outer body side, the second opening defining a channel that extends along a third direction crossing the second direction, and a barbell including a shaft and a pair of beads at opposing ends of the shaft, the barbell being received in the second opening.

20 Claims, 5 Drawing Sheets

(56) References Cited

U.S. PATENT DOCUMENTS

| | | | |
|---|---|---|---|
| 2011/0296961 A1* | 12/2011 | Ortiz | B25B 23/0085 81/124.1 |
| 2012/0132041 A1* | 5/2012 | Bills | B25B 13/48 81/442 |
| 2013/0160264 A1* | 6/2013 | Reyes | B25B 13/488 29/278 |
| 2014/0091187 A1* | 4/2014 | Stenhouse | F16M 13/02 248/284.1 |
| 2016/0047413 A1* | 2/2016 | Haas | B66C 1/66 248/324 |

* cited by examiner

TENSION LEVER

BACKGROUND

1. Field

Embodiments of the present disclosure relate to a tension lever.

2. Description of Related Art

A mounting apparatus is used for mounting an object, such as a flat screen television, a computer monitor, etc. The mounting apparatus is usually adjustable to accommodate screens of different sizes, and to allow a user to tilt or laterally move the screen affixed thereto. Once the mounting apparatus is in a desired configuration, components of the mounting apparatus are tightened to one another so that the mounting apparatus remains in the desired configuration.

Such tightening is usually by rotation of a threaded nut or a lever. However, depending on the distance between a mounting surface (e.g., a wall) and a mounted object (e.g., a television screen), it may be difficult for a user to access the nut or the lever while the mounted object is mounted on the frame. As such, the user may need to remove the mounted object to gain access to the nut or lever, reducing the ability of the user to adjust the mounting apparatus on the fly. Further, the user may need to use equipment, such as a socket wrench, that may not be readily available and that may also be difficult to fit between the mounting surface and the mounted object or that may be difficult to rotate without interference even if the device can engage the nut.

SUMMARY

One or more embodiments of the present disclosure are directed to a tension lever. The tension lever is configured to be adjustable by a variety of structures of the tension lever, namely, by force applied to a barbell inserted through a body portion of the lever, by force applied to an outer surface of the tension lever, and by force applied to an inner surface of the tension lever.

According to one or more embodiments, a tension lever includes an outer body including a top, a bottom, and a plurality of outer body sides including a first outer body side and a second outer body side opposite to and facing the first outer body side, the first outer body side having a substantially planar surface extending along a first direction and a second direction crossing the first direction, an upper first opening defined in the top and defining an upper inner body that extends along the second direction, a lower first opening defined in the bottom and defining a lower inner body that extends along the second direction, a second opening defined in the first outer body side and the fourth outer body side, the second opening defining a channel that extends along a third direction crossing the second direction, and a barbell including a shaft and a pair of beads at opposing ends of the shaft, the barbell being received in the second opening.

According to one or more embodiments, a wall mount includes a pair of vertical rails, a pair of tilt rails, a wall plate, a locking mechanism, and a tension lever including an outer body including a top, a bottom, and a plurality of outer body sides including a first outer body side and a second outer body side opposite to and facing the first outer body side, the first outer body side having a substantially planar surface extending along a first direction and a second direction crossing the first direction, an upper first opening defined in the top and defining an upper inner body that extends along the second direction, a lower first opening defined in the bottom and defining a lower inner body that extends along the second direction, a second opening defined in the first outer body side and the fourth outer body side, the second opening defining a channel that extends along a third direction crossing the second direction, and a barbell including a shaft and a pair of beads at opposing ends of the shaft, the barbell being received in the second opening.

BRIEF DESCRIPTION OF THE DRAWINGS

These and other features and aspects of embodiments of the present disclosure will be better understood by reference to the following detailed description, when considered in conjunction with the accompanying figures. The same numbers are used throughout the figures to reference like features and components.

DETAILED DESCRIPTION

The present disclosure relates to a tension lever that is configured to be adjusted by different devices due to the structure of the tension lever. Particularly, the tension lever is adjustable via force applied to one or more of multiple surfaces of the tension lever. The drawings depict some example embodiments as applied to a television mount for illustrative purposes only, and it will be apparent that modifications may be made without departing from the spirit and scope of the invention, and also that the present disclosure may also be used in other applications in the same or similar fields. Although relative terms such as "first," "second," "top," "bottom," "left," "right," and similar terms have been used herein to describe relative spatial relationships between elements, it is to be understood that these terms are intended to encompass different orientations of the various elements and components of the device in addition to the orientation depicted in the figures. Moreover, the figures contained in this application are not necessarily drawn to scale and various features may be exaggerated.

Figure 1:
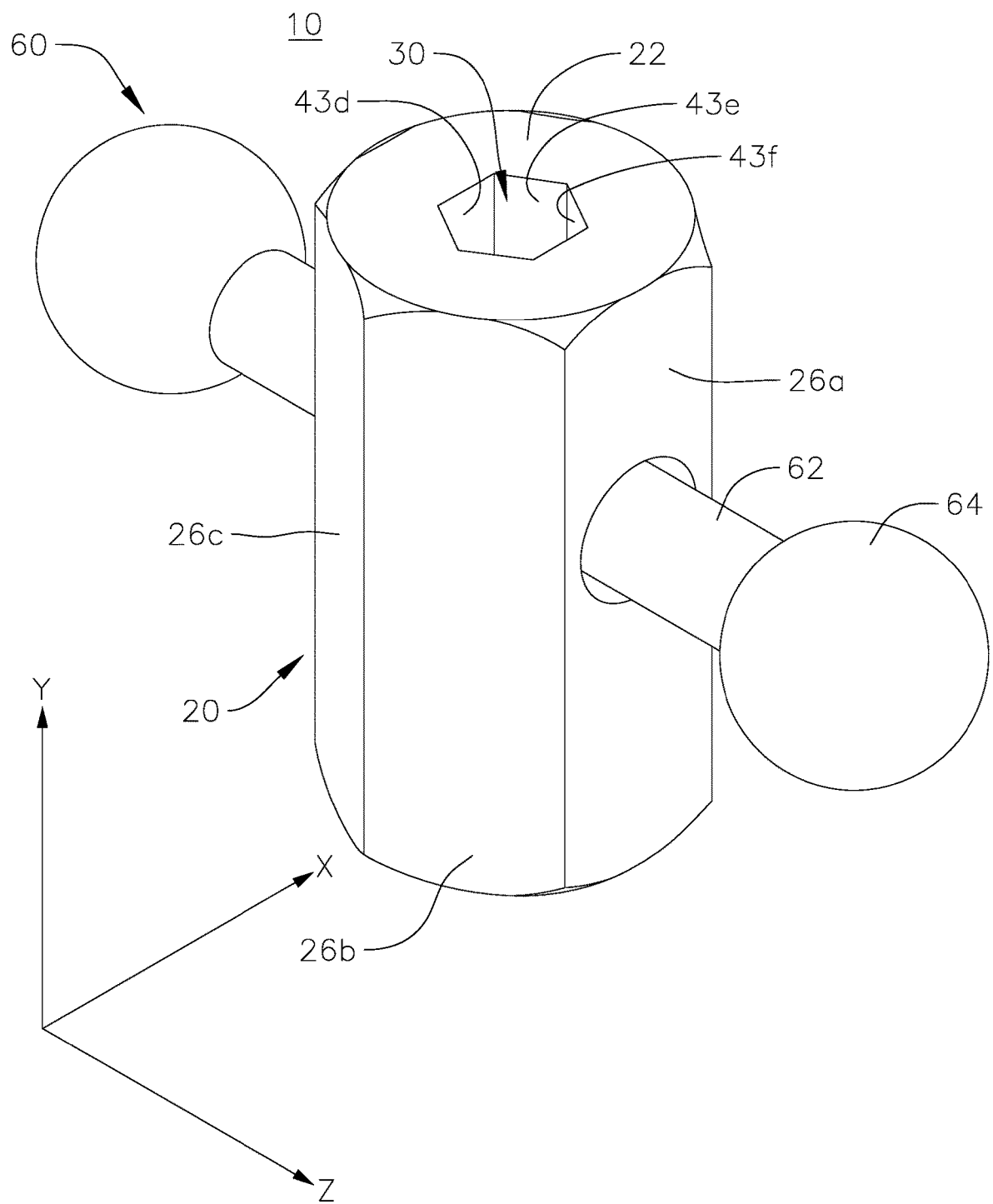
FIG. 1 is a front perspective view of a tension lever according to one or more embodiments.
Figure 2:
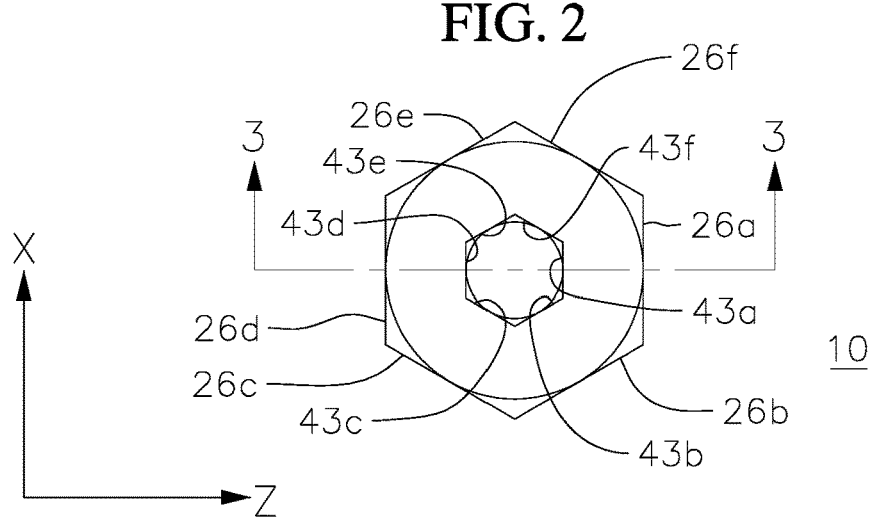
FIG. 2 is a top view of the tension lever according to one or more embodiments without a barbell.
Figure 3:
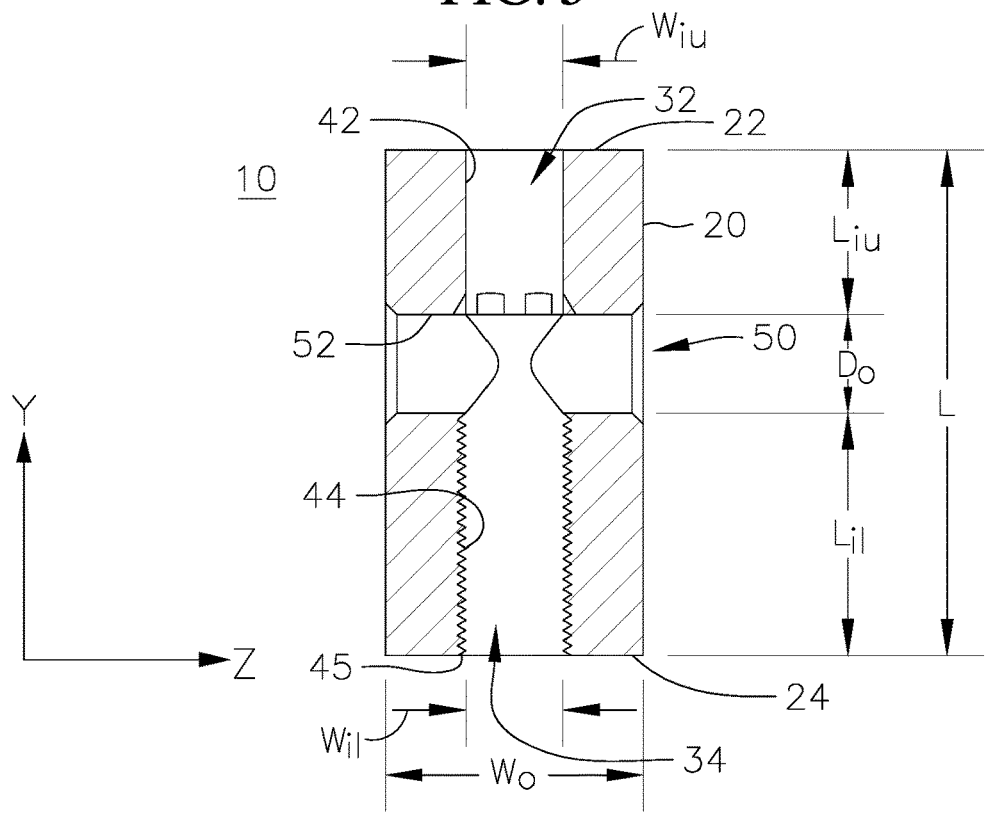
FIG. 3 is a cross-sectional view of the tension lever of FIG. 1 taken along the line 3-3 of FIG. 2.

Referring now to an example embodiment illustrated in FIGS. 1-3, a tension lever 10 has an outer body 20 having a top 22, a bottom 24, and a plurality of outer body sides 26, a first opening 30 defining an inner body 40, a second opening 50, and a barbell 60.

In some embodiments, the plurality of outer body sides 26 may include six sides which may form a regular hexagon: a first outer body side 26a, a second outer body side 26b, a third outer body side 26c, a fourth outer body side 26d, a fifth outer body side 26e, and a sixth outer body side 26f. The first outer body side 26a and the fourth outer body side 26d may face each other, the second outer body side 26b and the fifth outer body side 26e may face each other, and the third outer body side 26c and the sixth outer body side 26f may face each other. The first outer body side 26a may have a substantially planar surface extending along a first direction X and a second direction Y crossing the first direction X. In some embodiments, the first direction X and the second direction Y are perpendicular to each other. In some embodiments each of the plurality of outer body sides 26 is substantially planar and has substantially the same size. Although reference is made to an embodiment wherein the outer body 20 has six sides, the present invention is not limited thereto, and the outer body 20 may have any suitable shape, either regular or irregular, such that the tension lever 10 is rotatable when a force (e.g., torque) is applied to the outer body 20.

In some embodiments, the outer body sides 26 may have smoothed corners (or edges) in areas adjacent the top 22 and/or the bottom 24. For example, the outer body sides 26 may have a bevel or a chamfer, and/or be rounded according to a specific radius at the areas adjacent the top 22 and/or the bottom 24. As such, the tension lever 10 may not have any sharp edges at or near the top 22 or the bottom 24, reducing the likelihood of damaging walls or adjacent objects.

In some embodiments, the first opening 30 may be a through-hole extending in the second direction Y from the top 22 to the bottom 24. In other embodiments, the first opening 30 may include an upper first opening 32 defined in the top 22 and extending through a portion of the tension lever 10 and a lower first opening 34 defined in the bottom 24 and extending through another portion of the tension lever 10. In some embodiments, the first opening 30 may not be continuous through the tension lever 10, i.e., the outer body 20 may contain two first openings separated from each other. A center-line of the first opening 30 (e.g., extending along the second direction Y) may coincide with a center-line of the tension lever 10 (e.g., extending along the second direction Y). Further, it will be appreciated that a center-line of the upper first opening 32, a center-line of the lower first opening 34, and the center-line of the tension lever 10 extending along the second direction Y may all coincide with each other.

The inner body 40 defined by the first opening 30 may include an upper inner body 42 (e.g., corresponding to the upper first opening 32) and a lower inner body 44 (e.g., corresponding to the lower first opening 34). The upper inner body 42 may include a plurality of inner body sides 43. For example, the plurality of inner body sides 43 may include six sides: a first inner body side 43a, a second inner body side 43b, a third inner body side 43c, a fourth inner body side 43d, a fifth inner body side 43e, and a sixth inner body side 43f. The first inner body side 43a and the fourth inner body side 43d may face each other, the second inner body side 43b and the fifth inner body side 43e may face each other, and the third inner body side 43c and the sixth inner body side 43f may face each other. In some embodiments each of the plurality of inner body sides 43 is substantially planar and has substantially the same size. In some embodiments, the first inner body side 43a may be parallel to (or substantially parallel to) the first outer body side 26a, the second inner body side 43b may be parallel to (or substantially parallel to) the second outer body side 26b, etc. However, embodiments of the present disclosure are not limited thereto, and in some embodiments, the upper inner body 42 and the outer body 20 may be offset from each other such that none of the inner body sides 43 are parallel to any of the outer body sides 26.

Although reference is made to an embodiment wherein the upper inner body 42 has six sides, the present invention is not limited thereto, and the upper inner body 42 may have any suitable shape such that the tension lever 10 is rotatable when force is applied to the upper inner body 42, as discussed further below.

In some embodiments, the lower inner body 44 includes threads 45 so that the tension lever 10 (e.g., the lower first opening 34) may be mated with a male threaded part. In some embodiments, a portion of the lower inner body 44 may include the threads 45. However, the present invention is not limited thereto, and in some embodiments, the lower inner body 44 in its entirety may include the threads 45, for example.

In some embodiments, the tension lever 10 further includes the second opening 50. The second opening 50 may extend in a third direction Z crossing the second direction Y and the first direction X (e.g., a third direction Z that is orthogonal to the second direction Y and the first direction X). For example, the second opening 50 may be defined in the first outer body side 26a and the fourth outer body side 26d (e.g., may be a through-hole extending from the first outer body side 26a to the fourth outer body side 26d in the third direction Z). The second opening 50 may be located between the upper first opening 32 and the lower first opening 34. The second opening 50 may have a circular (or substantially circular) shape and may define a channel 52 also having a circular (or substantially circular) shape extending through the tension lever 10. The channel 52 may have a smooth surface. Ends of the channel 52 may have a bevel (or bezel or chamfer or curved radius) such that the channel 52 has a first diameter at a first portion thereof (e.g., at a first portion near the center-line of the tension lever 10) and a second diameter that is greater than the first diameter at the outer body 20 (e.g., at an outer surface of the outer body 20).

A barbell 60 may be inserted into the second opening 50. The barbell 60 may have a shaft 62 and two beads 64 at opposing ends of the shaft 62 that are exposed from the second opening 50 to allow manual operation of the tension lever 10. The beads 64 may each have a spherical shape (or a substantially spherical shape) with a flattened edge that abuts the shaft 62 (see FIG. 4). The shaft 62 may have a cylindrical shape (or a substantially cylindrical shape). The shaft 62 may have a shaft diameter Ds that is less than a channel diameter Dc of the channel 52 so that the shaft 62 may be movably inserted into the second opening 50 (and received in the channel 52). The beads 64 may be sized such that a diameter Db of the bead 64 is greater than the channel diameter Dc of the channel 52. As such, the beads 64 remain exposed outside of the second opening 50.

In some embodiments, the shaft 62 and the beads 64 may each be threaded. For example, the shaft 62 may be a male threaded part and the beads 64 may each have female threaded parts. As such, during assembly of the barbell 60, the shaft 62 may be inserted into the second opening 50 and the beads 64 may be threaded onto the shaft 62. However, embodiments of the present disclosure are not limited thereto. For example, in some embodiments the beads 64 may be welded to the shaft 62.

The tension lever 10 may be any suitable material. For example, the tension lever 10 may include a metal, such as aluminum (e.g., AL 6061) or steel. In some embodiments, the outer body 20 and the inner body 40 may include aluminum and the barbell 60 may include steel.

Figure 5:
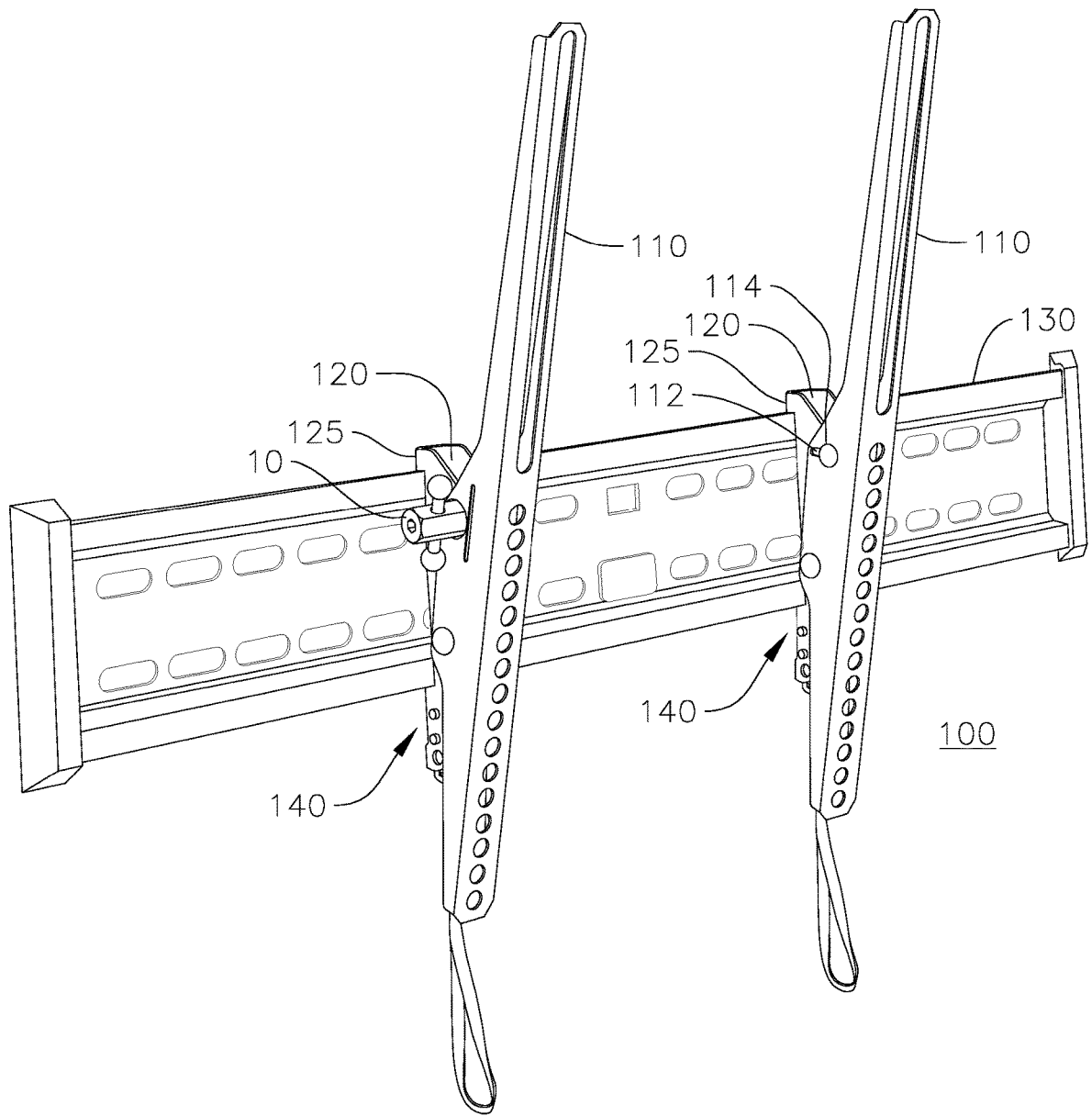
FIG. 5 is a perspective view of a wall mount having a tension lever according to one or more embodiments.
Figure 6A:
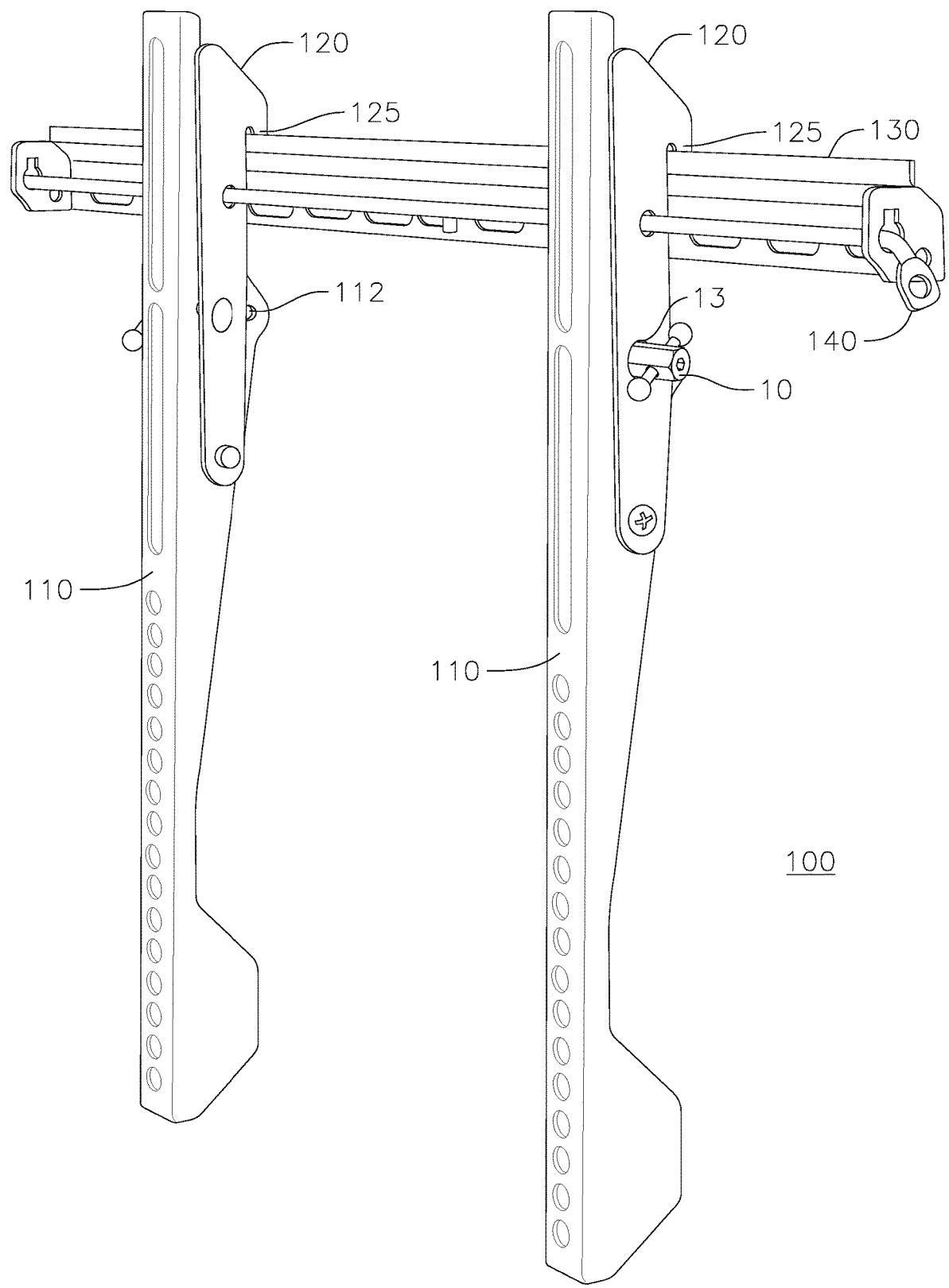
FIG. 6A is a perspective view of a wall mount having a tension lever according to one or more embodiments in a tightened configuration.
Figure 6B:
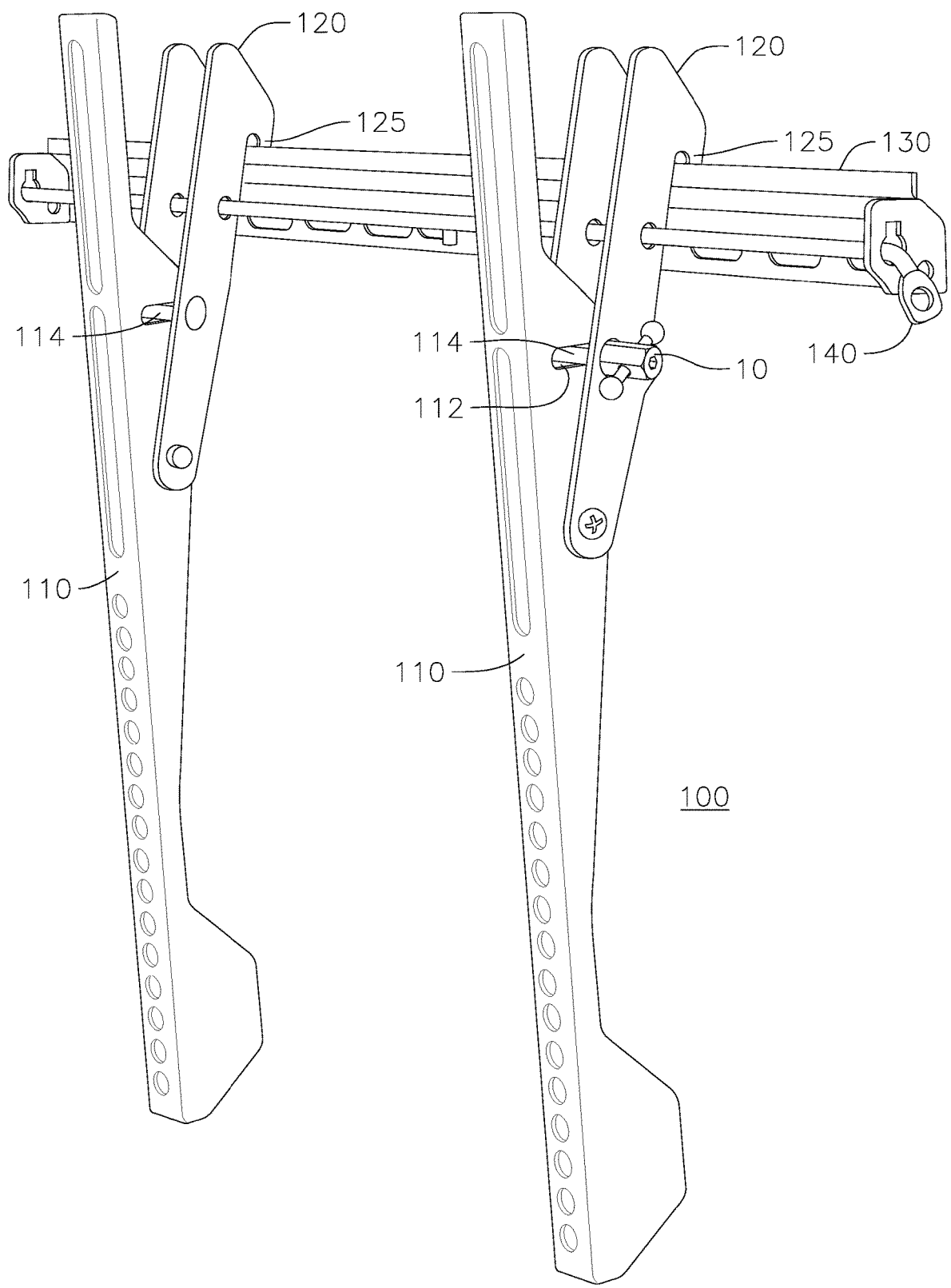
FIG. 6B is a perspective view of a wall mount having a tension lever according to one or more embodiments in a loosened configuration.

Referring to the example embodiments illustrated in FIGS. 5, 6A, and 6B, the tension lever 10 according to one or more embodiments of the present disclosure may be utilized with a wall mount 100 for mounting a screen. The wall mount may include a pair of vertical rails 110, each of the vertical rails 110 having a tilt rail (or tilt bracket or vertical tilt rail) 120, a wall plate 130, and a locking mechanism 140. The tilt rails 120 may respectively be attached to the pair of vertical rails 110. For example, a lower portion of a respective tilt rail 120 may be affixed to a respective one of the vertical rails 110, and an upper portion of the respective tilt rail 120 may be free. The upper portion (or free end) of the tilt rail 120 may have a downward curved portion (e.g., a hook) 125. It will be appreciated that although reference is made to a "vertical" rail, the orientation of the rail is not limited thereto or thereby. As used herein, the term "vertical" is generally used to denote a relationship between the "vertical" rail and the screen (which is also considered to be positioned in a "vertical" configuration).

The vertical rail 110 may include a pair of openings 13 and the tilt rail 120 may include an opening or a slot 112 that is perpendicular to (or substantially perpendicular to) a surface of the vertical rail 110 that abuts the screen. A rod 114 (e.g., a rod threaded at one end or a threaded bolt or a threaded carriage bolt) may be located inside the slot 112 and the pair of openings 13 to connect (or secure) the tilt rail 120 and the vertical rail 110 to each other at an intermediate portion between the lower portion and the upper portion.

To mount the screen to a wall, the wall plate 130 is mounted to the wall, the vertical rails 110 are mounted to the screen, and the hook 125 of the tilt rail 120 is attached to (or connected to) the wall plate 130. The locking mechanism 140 is then utilized to lock the tilt rail(s) 120 to the wall plate 130. In some embodiments (see, e.g., FIG. 5), the locking mechanism 140 may include a spring latch adjacent the lower portion of the tilt rail 120. In some embodiments (see, e.g., FIGS. 6A and 6B), the locking mechanism 140 may include a locking bar that is inserted into the tilt rail 120 and the wall plate 130.

To tilt the screen, the rod 114 may be moved (e.g., slidably moved) along the slot 112, thereby adjusting an orientation of the vertical rails 110 and the screen. It will be appreciated that once the screen is in a desirable position, a force (e.g., a friction force) should be applied to the tilt rail 120 and the vertical rail 110 so that the rod 114 remains in its position. According to embodiments of the invention, the tension lever 10 is threaded onto the rod 114 and tightened or loosened on the rod 114 to respectively allow for movement of the rod 114 in the slot 112 and to apply a lateral force to the vertical rails 110 and the tilt rail 120. In other words, the tension lever 10 is tightened by rotation in a first rotational direction about the threaded end of the rod 114 and is loosened by rotation in a second rotational direction opposite to the first rotational direction.

According to one or more embodiments, the threaded end of the rod 114 is inserted into the lower first opening 34 such that the threads 45 of the lower inner body 44 mate with the threads of the rod 114. To rotate the tension lever 10, a user may move (e.g., slide) the barbell 60 along the channel 52 to provide a lever arm, and the user may use one or more fingers and the lever arm (i.e., the barbell 60) to rotate the tension lever 10 thereby adjusting the lateral force applied to the vertical rails 110 and the tilt rail 120. The barbell 60 may be moved (e.g., slid) along the channel 52 in order to provide a suitable length of the lever arm and to facilitate rotation of the tension lever 10. Alternatively, the user may apply a torque to the outer body 20 of the tension lever 10, for example, by use of a socket wrench having a suitable configuration according to a shape and a number of outer body sides 26 of the tension lever 10. As such, a force may be applied to the socket wrench, which then rotates the tension lever 10 and adjusts the lateral force applied to the vertical rails 110 and the tilt rail 120. As yet another alternative, the user may apply a torque to the upper inner body 42 of the by inserting a key (e.g., a hex key, an ALLEN® wrench (ALLEN® is a registered trademark of Apex Tool Group, LLC)) into the upper first opening 32 and applying force to the upper inner body 42 to rotate the tension lever 10.

As such, the tension lever 10 is configured to be rotated (e.g., easily rotated) by applying force to any one or more of the barbell 60, the outer body 20, and/or the upper inner body 42. Thus, a user may adjust the tension applied to the tension lever 10 (and therefore may adjust the screen on the wall mount 100 by adjusting the tension lever 10 by hand, with a socket wrench, and with a key, decreasing the likelihood that the user will need to purchase additional tools to adjust the tension lever 10, and providing the user with multiple options for adjusting the tension lever 10. Further, in some instances, there may be a relatively small clearance between the wall and the screen and it may therefore be difficult for the user to access the tension lever 10 to apply force using a hand or a socket wrench, while access with a key via the upper first opening 32 may be easily obtained.

As discussed above, the upper inner body 42 may have any suitable shape, and may be configured to be adjusted by a key. As non-limiting examples, the upper inner body 42 may have any suitable shape such that it may be adjusted by a key having a slot shape, a Phillips head shape, a Pozidriv shape, a Frearson shape, a square shape, a Robertson shape, a 12-point flange shape, a Torx shape, a Tri-Wing shape, a Troq-set shape, etc. According to embodiments of the invention, the upper inner body 42 and the outer body 20 may have substantially the same shape (e.g., may both have a hexagonal shape) and may have the same configuration (e.g., the first outer body side 26a may be parallel to the first inner body side 43a) such that an amount of material between the outer body 20 and the upper inner body 42 is substantially the same throughout the tension lever 10, which provides greater structural integrity to the tension lever 10. However, it will be appreciated that the upper inner body 42 and the outer body 20 may have different shapes that accommodate the use of appropriately shaped tools to adjust the tension lever 10.

Figure 4:
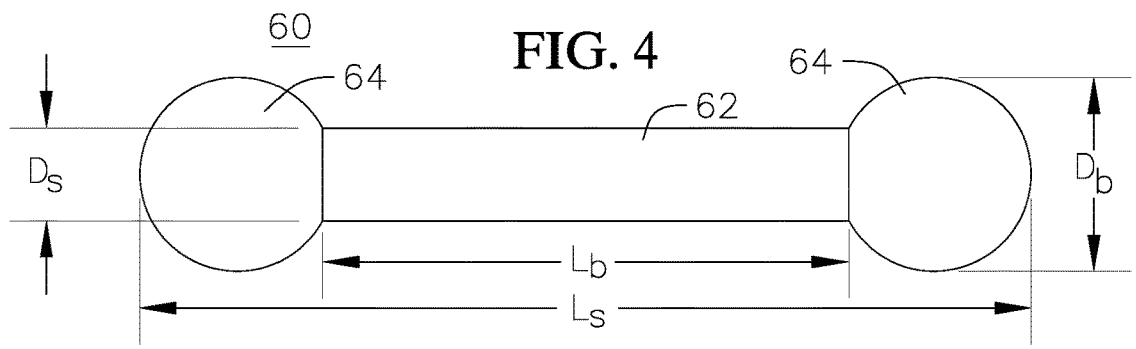
FIG. 4 is a side view of a barbell according to one or more embodiments of the present invention.

Referring to FIGS. 3 and 4, in some embodiments, a width Wo of the outer body 20 may be approximately ⅓ of a length Lb of the barbell 60. For example, in an exemplary embodiment, the width Wo may be 0.5 inches and the length Lb may be 1.7 inches. As such, when the barbell 60 is centered inside of the outer body 20, the barbell 60 may extend on each side of the outer body 20 by approximately the same amount as the width Wo of the outer body 20. In some embodiments, the diameter Db of each of the beads 64 may be equal to about ¾ of the width Wo, and a length Ls of the shaft 62 may be equal to about twice the with Wo. For example, in an exemplary embodiment, the diameter Db may be 0.38 inches and the length Ls of the shaft 62 may be 1 inch.

As discussed above, the channel diameter Do of the channel 52 may be slightly greater than the shaft diameter Ds of the shaft 62. For example, in an exemplary embodiment, the channel diameter Do may be 0.19 inches and the shaft diameter Ds may be 0.18 inches.

In some embodiments, a width Wiu of the upper first opening 32 may be approximately 38% of the width Wo of the outer body 20. For example, in an exemplary embodiment, the width Wiu may be 0.191 inches or 0.189 inches. The upper first opening 32 may have a depth Liu (e.g., in the second direction Y) that is less than a depth Lil of the lower first opening 34 (e.g., in the second direction Y). As such, the second opening 50, which is located between the upper first opening 32 and the lower first opening 34 may be offset in the second direction Y such that a center-line of the second opening 50 is closer to the top 22 than the bottom 24. For example, in an exemplary embodiment, the depth Liu of the upper first opening 32 may be 0.315 inches, the depth Lil of the second opening may be 0.475 inches, and the diameter Do may be 0.19 inches. As such, a length L of the outer body 20 in the second direction Y may be 0.98 inches. It will be appreciated, however, that in some embodiments, the second opening 50 may not be in fluid communication with the upper first inner opening 32 and/or the lower first opening 34.

In some embodiments, a width Wil of the lower first opening 34 may be greater than the width Wio of the upper first opening 32. For example, the width Wil of the lower first opening 34 may be approximately 20% greater than the width Wio of the first upper opening. For example, in an exemplary embodiment, the width Wil of the lower first opening 34 may be 0.236 inches (or 6 mm) and the width of the upper first opening 32 may be 0.191 inches (or 5 mm). In some embodiments, the lower first opening 34 may be configured to receive an M6×L15 male thread.

The preceding description has been presented with reference to various embodiments of the present disclosure. Persons skilled in the art to which this disclosure pertains will appreciate that alterations and changes in the described structures and methods of construction can be practiced without meaningfully departing from the principles, spirit, and scope of this disclosure.

While this disclosure has been described in detail with particular references to some exemplary embodiments thereof, the exemplary embodiments described herein are not intended to be exhaustive or to limit the scope of the disclosure to the exact forms disclosed. Persons skilled in the art and technology to which this disclosure pertains will appreciate that alterations and changes in the described structures and methods of assembly and construction can be practiced without meaningfully departing from the principles, spirit, and scope of this disclosure, as set forth in the following claims.

What is claimed is:

1. A tension lever comprising:
   an outer body comprising:
      a top;
      a bottom; and
      a plurality of outer body sides comprising a first outer body side and a fourth outer body side opposite to and facing the first outer body side, the first outer body side having a substantially planar surface extending along a first direction and a second direction crossing the first direction;
   an upper first opening defined in the top and defining an upper inner body that extends along the second direction, wherein the upper inner body has a smooth surface;
   a lower first opening defined in the bottom and further defining a cylindrical lower inner body having a uniform internal width as the lower inner body extends along the second direction to an inner end of the lower inner body, wherein the lower inner body has internal threads disposed in a cylindrical helix of uniform internal width as the threads extend along the second direction and is configured to be threaded onto a provided separate external threaded bolt;
   a second opening defined in the first outer body side and the fourth outer body side, the second opening defining a channel that extends along a third direction crossing the second direction, the channel disposed in proximal contact with the inner end of the lower inner body, and an inner end of the upper inner body; and
   a barbell comprising a shaft and a pair of beads at opposing ends of the shaft, the barbell being accommodated in the second opening and slidable along the channel such that a distance from a first bead from among the pair of beads to the first outer body side is variable and a distance from a second bead from among the pair of beads to the fourth outer body side is variable as the barbell slides in the channel; and
   wherein the tension lever is configured so that a torque applied to the tension lever through at least one of the barbell, the outer body sides, or the upper inner body provides a lateral force by the tension lever and the provided threaded bolt that is threaded into the lower first opening body of tension lever.

2. The tension lever of claim 1, wherein the upper inner body comprises a plurality of upper inner body sides.

3. The tension lever of claim 2, wherein a number of the plurality of upper inner body sides is equal to a number of the plurality of outer body sides.

4. The tension lever of claim 3, wherein the plurality of upper inner body sides comprises six upper inner body sides each have substantially the same shape as each other,
   and wherein the plurality of outer body sides comprises six outer body sides each have substantially the same shape as each other.

5. The tension lever of claim 4, wherein a first upper inner body side from among the plurality of upper inner body sides extends along a first direction and parallel to the first outer body side, a second upper inner body side from among the plurality of upper inner body sides extends parallel to a second outer body side, a third upper inner body side from among the plurality of upper inner body sides extends parallel to a third outer body side from among the plurality of outer body sides, a fourth upper inner body side from among the plurality of upper inner body sides extends along the first direction and parallel to the fourth outer body side from among the plurality of outer body sides, a fifth inner body side from among the plurality of upper inner body sides extends parallel to a fifth outer body side from among the plurality of outer body sides, and a sixth inner body side from among the plurality of upper inner body sides extends parallel to a sixth outer body side from among the plurality of outer body sides.

6. The tension lever of claim 1, wherein the channel has a substantially smooth surface and the shaft has a substantially smooth surface.

7. The tension lever of claim 1, wherein the lower inner body is threaded such that it is configured to receive a male threaded object.

8. The tension lever of claim 1, wherein a depth of the upper first opening in the second direction is less than a depth of the lower first opening in the second direction.

9. The tension lever of claim 1, wherein a distance between a center-line of the second opening and the top is less than a distance between the center-line of the second opening and the bottom.

10. The tension lever of claim 1, wherein a width of the outer body along the third direction is equal to approximately ⅓ a length of the barbell along the third direction.

11. The tension lever of claim 1, wherein the upper first opening and the second opening are in fluid communication.

12. The tension lever of claim 1, wherein the lower first opening and the second opening are in fluid communication.

13. The tension lever of claim 12, wherein the lower first opening and the second opening are in fluid communication with the upper first opening.

14. The tension lever of claim 1, wherein a diameter of the channel is 0.01 inch greater than a diameter of the shaft of the barbell.

15. The tension lever of claim 1, wherein an outer width of the top is equal to an outer width of the bottom.

16. The tension lever of claim 1, wherein the beads are spherical.

17. The tension lever of claim 1, wherein:
the shaft and beads are threaded;
the shaft comprises respective male threaded parts; and
the beads each have respective female threaded parts to receive the respective male threaded parts of the shaft.

18. The tension lever of claim 1, wherein the upper inner body comprises a shape that may accept a key having at least one of a slot shape, a Phillips head shape, a Pozidriv shape, a Frearson shape, a square shape, a Robertson shape, a 12-point flange shape, a Torx shape, a Tri-Wing shape, and a Troq-set shape.

19. A wall mount comprising:
a pair of vertical rails;
a pair of tilt rails;
a wall plate;
a locking mechanism;
a threaded rod extending through a first one of the pair of vertical rails and first one of the tilt rails; and
a tension lever comprising:
an outer body comprising:
a top;
a bottom; and
a plurality of outer body sides comprising a first outer body side and a fourth outer body side opposite to and facing the first outer body side, the first outer body side having a substantially planar surface extending along a first direction and a second direction crossing the first direction;
an upper first opening defined in the top and defining an upper inner body that extends along the second direction, wherein the upper inner body has a smooth surface;
a lower first opening defined in the bottom and further defining a cylindrical lower inner body having a uniform internal width as the lower inner body extends along the second direction to an inner end of the lower inner body, wherein the lower inner body has internal threads disposed in a cylindrical helix of uniform internal width as the threads extend along the second direction and is configured to be threaded onto the threaded rod;
a second opening defined in the first outer body side and the fourth outer body side, the second opening defining a channel that extends along a third direction crossing the second direction, the channel disposed in proximal contact with the inner end of the lower inner body, and an inner end of the upper inner body; and
a barbell comprising a shaft and a pair of beads at opposing ends of the shaft, the barbell being received in the second opening and slidable along the channel such that a distance from a first bead from among the pair of beads to the first outer body side is variable and a distance from a second bead from among the pair of beads to the fourth outer body side is variable as the barbell slides in the channel; and
wherein the tension lever is configured so that a torque applied to the tension lever through at least one of the barbell, the outer body sides, or the upper inner body provides a lateral force by the tension lever and the threaded rod to the first one of the pair of vertical rails and the first one of the pair tilt rails to allow locking or adjustment thereof.

20. The wall mount of claim 19, wherein the pair of vertical rails each comprise a slot,
wherein the pair of tilt rails each comprise an opening, and
wherein each of the slots and openings of the tilt rails accommodate a rod that is connected to the tension lever.

\* \* \* \* \*